United States Patent
Herrmann

(10) Patent No.: US 7,333,236 B2
(45) Date of Patent: Feb. 19, 2008

(54) METHOD FOR THE MAPPING OF COLOUR VALUES OF A COLOUR IMAGE IN THE COLOUR VALUES OF A HIGHLIGHT-COLOUR IMAGE AND CORRESPONDING PRINT SYSTEM

(75) Inventor: Hans Ulrich Herrmann, Freiburg (DE)

(73) Assignee: Oce Printing Systems GmbH, Poing (DE)

( * ) Notice: Subject to any disclaimer, the term of this patent is extended or adjusted under 35 U.S.C. 154(b) by 859 days.

(21) Appl. No.: 10/257,313

(22) PCT Filed: Apr. 6, 2001

(86) PCT No.: PCT/EP01/03988

§ 371 (c)(1),
(2), (4) Date: Mar. 11, 2003

(87) PCT Pub. No.: WO01/78374

PCT Pub. Date: Oct. 18, 2001

(65) Prior Publication Data

US 2003/0160982 A1     Aug. 28, 2003

(30) Foreign Application Priority Data

Apr. 10, 2000 (DE) .................... 100 17 830

(51) Int. Cl.
H04N 1/60 (2006.01)
H04N 1/46 (2006.01)
G03F 3/08 (2006.01)

(52) U.S. Cl. .................... 358/1.9; 358/523; 358/518; 358/515

(58) Field of Classification Search .............. 358/1.9, 358/523, 518, 515, 520; 382/167
See application file for complete search history.

(56) References Cited

U.S. PATENT DOCUMENTS

| | | |
|---|---|---|
| 4,903,048 A | 2/1990 | Harrington |
| 5,237,517 A | 8/1993 | Harrington et al. |
| 5,319,473 A | 6/1994 | Harrington |
| 5,655,062 A | 8/1997 | Tompkins et al. |
| 5,668,636 A | 9/1997 | Beach et al. |
| 5,680,230 A | 10/1997 | Kaburagi et al. |
| 5,982,924 A | 11/1999 | Power et al. |
| 6,115,493 A | 9/2000 | Harrington |
| 6,185,013 B1* | 2/2001 | Harrington et al. ......... 358/520 |
| 6,498,868 B1* | 12/2002 | Klassen ..................... 382/298 |
| 6,775,028 B1* | 8/2004 | Reel ........................... 358/1.9 |
| 6,833,937 B1* | 12/2004 | Cholewo .................... 358/518 |
| 6,972,869 B2* | 12/2005 | Harrington ................. 358/1.9 |

FOREIGN PATENT DOCUMENTS

| | | |
|---|---|---|
| EP | 0 781 035 A2 | 6/1997 |
| JP | 9-298673 | 11/1997 |

* cited by examiner

Primary Examiner—Houshang Safaipour
(74) Attorney, Agent, or Firm—Schiff Hardin LLP

(57) ABSTRACT

The invention relates to a mapping method, whereby color values of the color image to be mapped, represented in the RGB color space are mapped in the highlight-color color space, corresponding to a projection of the color values in highlight-color. The corresponding calculations are carried out in the RGB color space. A transformation into another color space is not necessary. Furthermore, various corrections are provided, such that a highlight color image is created which is as natural as possible for the human eye.

8 Claims, 4 Drawing Sheets

| $c_{in}$ | $c_{HC}$ |
|---|---|
| $c_{in-a}$ | |
| $c_{in-b}$ | |
| • | |
| • | |
| • | |
| • | |
| • | |
| • | |
| • | |

| $c_{in}$ | $c_{HC}$ |
|---|---|
| $= c_{in-1}$ | |
| $= c_{in-2}$ | |
| $c_{in-3}$ | |
| $c_{in-4}$ | |
| • | |
| • | |
| • | |
| • | |
| $c_{in-l}$ | |

| $c_{in}$ | $c_{HC}$ |
|---|---|
| $c_{in-1}$ | $c_{HC-1}$ |
| $c_{in-2}$ | $c_{HC-2}$ |
| $c_{in-3}$ | $c_{HC-3}$ |
| $c_{in-4}$ | $c_{HC-4}$ |
| • | • |
| • | • |
| • | • |
| • | • |
| $c_{in-l}$ | $c_{HC-l}$ |

METHOD FOR THE MAPPING OF COLOUR VALUES OF A COLOUR IMAGE IN THE COLOUR VALUES OF A HIGHLIGHT-COLOUR IMAGE AND CORRESPONDING PRINT SYSTEM

BACKGROUND OF THE INVENTION

1. Field of the Invention

The present invention is directed to a method for mapping color values of a color image onto the color values of a highlight-color image (HC image). In particular, the invention is directed to a method wherein the color values of the color image are represented as vectors of the RGB (Red, Green and Blue) color space, and the color values of the highlight-color image only comprise vectors of a highlight-color color space that covers the region in the RGB color space between all gray scale levels and a highlight-color color.

2. Description of the Related Art

U.S. Pat. No. 5,237,517 discloses a method for mapping color values of a color image onto the color values of a highlight-color image that covers only color values of a highlight-color color space. Such a highlight-color color space comprises all color values in the region between the gray scale levels and a predetermined highlight-color color. This method is also disclosed in "Principles for Mapping from Full Color to Highlight-color", Steven J. Harrington, in IS&T's Eighth International Congress on Advances in Non-Impact Printing technologies, 1992, pages 458 ff.

In this method, the color values of the color image, which are usually represented as RGB color values, are subjected to a coordinate transformation into YES color values. This is a specific color system wherein the fully saturated color values are arranged in a plane. The YES coordinate system comprises three coordinates Y, E, S, whereby Y is the brightness of the color value and E and S are respective color values that define a color plane. When mapping the color values of the color image onto the highlight-color color space, the respective color values are first projected into the color plane. The color value of the highlight-color color is also projected into the color plane, whereby the projected color value of the color value to be mapped is projected anew onto this projected color value. This projection ensues by means of a calculation of the cosine between the two projected color values, whereby this value is raised to the power of three. This exponentiation of the cosine value is expedient since the individual, fully saturated colors (red, yellow, green, cyan, blue, magenta) describe an angle of 60° in the color plane with the respectively adjacent color, so that mapping without raising to the third power would map half the amount onto two neighboring primary colors since the cosine of 60° is equal to ½. The mapping of such a large amount of a primary color onto another primary color, however, is undesired since this has an unnatural effect. Due to the exponentiation with three, the amount of the mapping is reduced to ⅛ in the mapping for the angle of 60°. It is also advantageous that the operational sign is retained in the exponentiation with three.

The color values mapped in this way onto the highlight-color space serve the purpose of driving the HC color of a printer or color picture screen. Since a color picture screen is usually driven with RGB color values, the mapped color values must be subjected to another coordinate transformation into the RGB color space.

SUMMARY OF THE INVENTION

The invention provides a simple method for mapping color values of a color image onto a highlight-color color space. In particular, the invention provides a method for mapping color values of a color image that are represented as vectors of the RGB (red, green, blue) color space onto the color values of a highlight-color image (HC image) that only comprise vectors in the highlight-color color space that covers the region in the RGB color space between all gray scale values and a highlight-color color, wherein a color value in the RGB color space is allocated to each picture element of the color image and a highlight-color color is prescribed by a color vector in the RGB color space, a color part of the highlight-color color is determined by vector subtraction of a black part from the color value, a color part of a color value to be mapped is determined by vector subtraction of a black part from the color value, the color values of the color image are mapped onto a color value of the highlight-color color space by determining a mapping factor by means of calculating the cosine between the color parts and a multiplication of the mapping factor by a unit vector that is directed in the direction of the highlight-color color, and the amount of the color part of the color value to be mapped.

According to another aspect of the invention, the method for mapping color values of a color image that are represented as vectors of the RGB color space onto different presentation elements such as, for example, color values of a highlight-color color space or different patterns, provides that the color values are determined; the frequency of occurrence of the individual color values is identified; the color values of the color image are sorted according to the frequency of occurrence; and a mapping table is produced wherein the sorted color values are respectively allocated to a presentation element in the sorted sequence.

Further aspects of the invention provide an apparatus in a printing system for implementing the method. Also provided by the invention is a computer program product that, when run on a computer, performs the method set forth above.

BRIEF DESCRIPTION OF THE DRAWINGS

The invention is explained in greater detail below by way of example with reference to the attached drawings.

DETAILED DESCRIPTION OF THE PREFERRED EMBODIMENTS

Figure 5:
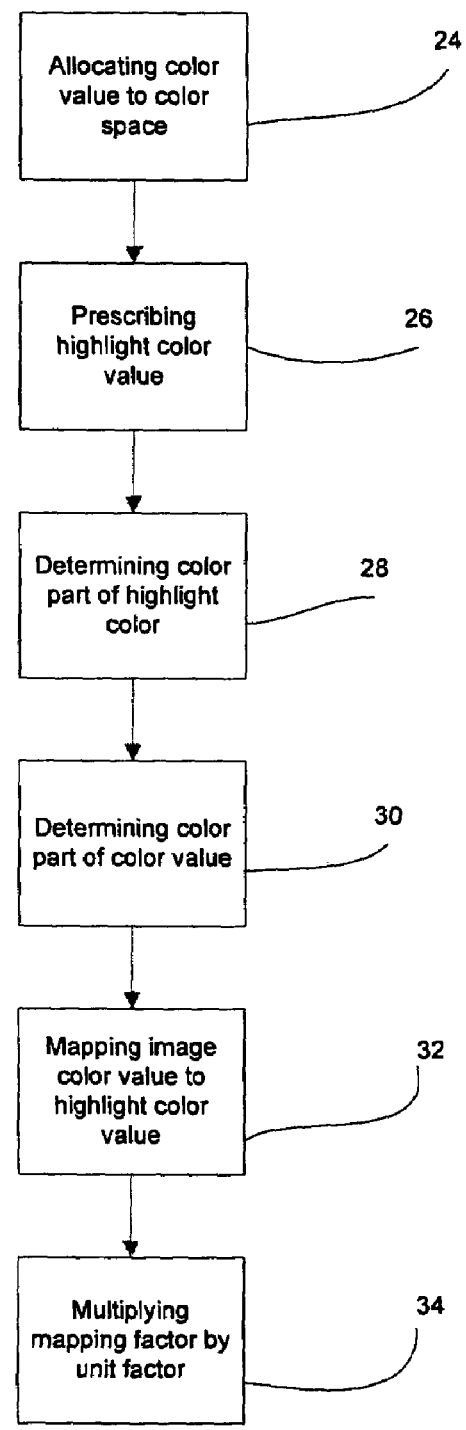
FIG. 5 is a flow diagram showing the steps of the method according to the principles of the present invention.

In the inventive method for mapping color values of a color image, the color values are represented as vectors of the RGB color space. The highlight-color color space comprises all color values that cover the region in the RGB color space between all gray scale levels and a highlight-color color. With reference to FIG. 5, a color value in the RGB color space is allocated to each picture element of the color image as shown in step 24, and a highlight-color color is prescribed by a color vector in the RGB color space as shown in step 26.

The inventive method is characterized in that a color part $F_{HC}$ of the highlight-color color $C_{HC}$ is determined as shown in step 28 by vector subtraction of a black part from the color value $C_{HC}$, a color part $F_{in}$ of a color value $C_{in}$ to be mapped is determined as shown in step 30 by vector subtraction of a black part from the color value $C_{in}$, the color values of the color image are mapped onto a color value $C'_{Gamut}$ of the highlight-color color space as shown in step 32 by determining a mapping factor p' by means of calculating the cosine between the color parts and a multiplication of the mapping factor p' by a unit vector $E_{HC}$ that is directed in the direction of the highlight-color color, and the amount of the color part $F_{in}$ of the color value $C_{in}$ to be mapped as shown in step 34.

With the inventive method, thus, the color values of a color image are mapped onto a highlight-color color space without needing a coordinate transformation. The individual calculations ensue with color values represented in the RGB color space. As a result thereof, rounding errors due to the additional coordinate transformation are avoided, and the mapping method, due to the elimination of the coordinate transformation, can be implemented faster than the traditional method.

Moreover, the inventive method is independent of the selection of the color of the highlight-color, i.e. it can be applied to any arbitrary highlight-color color without having to modify the nature of the calculation in any way whatsoever.

Preferably, corrections are implemented in the mapping by taking the black part of the color value to be mapped into consideration and/or by taking a color correction value into consideration.

With the inventive method, the color values of a color image are mapped onto the highlight-color color space, so that a complete description of the original color image in the highlight-color color space is available. Using a color image mapped in this way, half-tone separations can then be derived in a known way for driving a printer or a color picture screen or the like, as disclosed in greater detail in U.S. Pat. No. 5,237,517, which is incorporated herein by reference.

The above-described method produces a map of the color values of a color image onto the highlight-color color space that is optimally true-to-life for the human eye. It is especially suited for editing chromatic image data for presentation on a two-color display medium, for example in a printing process for printing a recording medium with two colors. A further embodiment of the invention creates a mapping method with which color images such as, for example, commercial graphics or other artificially designed images whose colors are not prescribed by an optimally true-to-life reproduction are mapped onto a highlight-color color space, whereby the mapping here optimally ensues such that the individual colors can be distinguished from one another optimally well in the highlight-color color image. To this end, a mapping table having color values uniformly distributed in the highlight-color color space is generated, and, using a hash function, the color values of the color image are allocated to the color values of the mapping table. Discrete color values that have a uniform, predetermined distance from one another in the color space are thus provided in the highlight-color color space. This assures that the individual color values of the highlight-color image can be distinguished well from one another.

Preferably, the above-described mapping with the projection of the color values to be mapped onto the color of the highlight-color in the RGB color space is employed as hash function.

In another preferred development of this method, the frequencies of occurrence of the individual color values in the color image to be mapped are determined, and the color values are allocated to the mapping table in the sequence of their frequency of occurrence. This assures that color values that occur often in the color image to be mapped have a color value in the highlight-color color space allocated to them with priority, so that there is a high probability that color values that are clearly distinguished from one another in the color image to be mapped are also clearly distinguished from one another in the mapped highlight-color image.

In an inventive method for mapping color values of a color image, the color values of the color image are represented as vectors of the RGB color space. In the present description of the invention, vectors are represented by upper case letters and scalars are represented by lower case letters. The color black is represented by the vector (0, 0, 0) and the color white is represented by the vector (255, 255, 255). The color values of the color image to be mapped are respectively represented by a vector $C_{in}$ with $(r_{in}, g_{in}, b_{in})$.

The following notations which are known from vector mathematics are employed in the description of the invention. Two color values $C_1$, $C_2$ are multiplied by one another with the scalar or vector product according to the following equation:

$$C_1 \cdot C_2 := r_1 \cdot r_2 + g_1 \cdot g_2 + b_1 \cdot b_2$$

The norm of a vector is calculated according to the following equation:

$$|C_1| := \sqrt{r_1^2 + g_1^2 + b_1^2}.$$

U.S. Pat. No. 5,319,473 and U.S. Pat. No. 5,237,517 can also be useful for understanding the invention, their contents being herewith incorporated by reference into the present specification.

Figures 1, 2A, 2B, 2C:
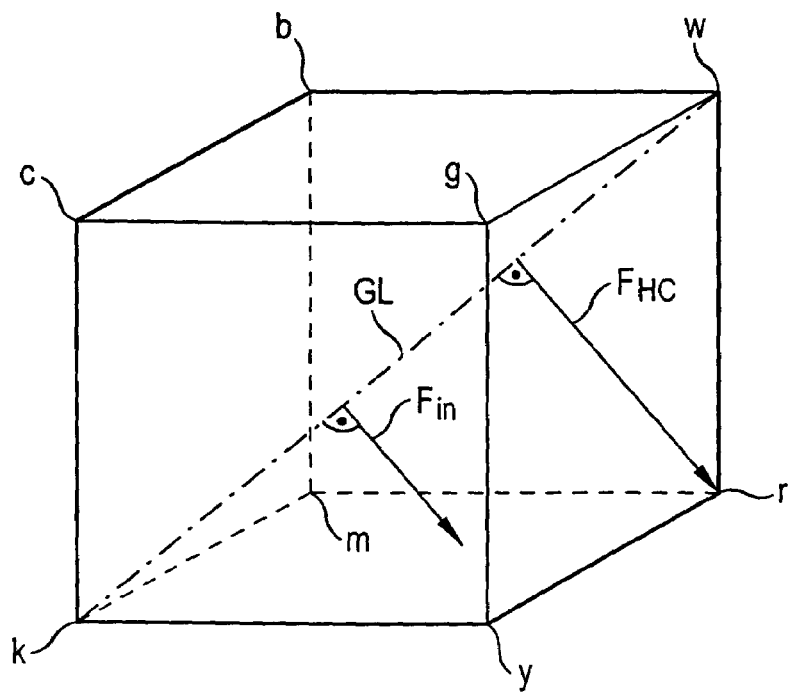
FIG. 1 is a cube for representing the RGB color space with the colors w=white, k=black, r=red, g=green, b=blue, c=cyan, m=magenta and y=yellow.
FIGS. 2a through 2c are mapping tables, shown schematically.

FIG. 1 shows the RGB space by means of a cube, whereby the corners of the cube have the colors k=black, y=yellow, r=red, m=magenta, w=white, b=blue, c=cyan and g=green allocated to them. The diagonal line GL from black to white covers all gray scale values of the RGB color space. This diagonal is therefore referred to below as gray lines GL. The unit vector pointing from black to white along the gray line GL is of significance for the following explanations of the invention, this being represented in the following way:

$$E_{Diag} := \left(1/\sqrt{3};\, 1/\sqrt{3};\, 1/\sqrt{3}\right)$$

The black part $k_{in}$ of the color value Cin is defined in the following way:

$$k_{in} = E_{Diag} \cdot C_{in} = (r_{in} + g_{in} + b_{in})/\sqrt{3}$$

Since, given the present exemplary embodiment, black is represented by (0, 0, 0) and white is represented by (255, 255, 255), the black part $k_{in}$ has a value range from 0 through 255, whereby 0 represents the maximum and 255 represent the minimum black part.

The black part vector $K_{in}$ of the color $C_{in}$ is, consequently, as follows:

$$K_{in}=k_{in} \cdot E_{Diag}$$

Consequently, a color part vector can also be calculated from the color value according to the following equation:

$$F_{in}=C_{in}-k_{in} \cdot E_{Diag}$$

In a corresponding way, the color part vector of the highlight-color color can also be represented:

$$F_{HC}=C_{HC}-k_{HC} \cdot E_{Diag}$$

In FIG. 1, the color part vector $F_{HC}$ of the highlight-color red is entered with $C_{HC}=(255, 0, 0)$. The color part vector is orthogonal to the gray line GL. The analogous applies to the color part vector $F_{in}$ of an arbitrary color value.

Since the color part vectors are orthogonal to the gray line, they lie in the plane that is orthogonal to the gray line and that can be referred to as color plane since the vectors contained therein are independent of the gray part. A mapping onto the highlight-color color can be implemented in this color plane, this being described in greater detail below, even though a coordinate transformation is not needed for this purpose, as is applied given the initially described method (transformation into YES).

A mapping factor P' is calculated according to the following equation from the color part vectors $F_{in}$ of a color value to be mapped and the highlight-color:

$$p'(C_{HC},C_{in})=\cos^3(F_{HC},F_{in}),$$

when $\cos(F_{HC}, F_{in})>0$, otherwise $p'(C_{HC}, C_{in})=0$ applies.

The cosine function between two vectors in the Euclidean vector space is defined by the following vector product:

$$\cos(F_{HC}, F_{in}) = \frac{F_{HC} \cdot F_{in}}{|F_{HC}| \cdot |F_{in}|}$$

Using the mapping factor p', the color part vector $F_{in}$ mapped onto the color part vector $F_{HC}$ of the highlight-color color is calculated in the following way:

$$C''_{Gamut}=|F_{in}|p'(C_{HC},C_{in}) \cdot F_{HC}/|F_{HC}|$$

In this equation, $F_{HC}/|F_{HC}|$ represents the unit vector $E_{HC}$ that is directed in the direction of the color of the highlight-color. The map vector $C''_{Gamut}$ thus has the direction of the highlight-color in the RGB color space with the amount of the color part vector $F_{in}$ of the color value to be mapped, this being multiplied by the mapping p'.

The black part of the color value to be mapped has not yet been taken into consideration in this mapping. The above mapping vector can therefore be supplemented in the following way:

$$C'_{Gamut}=|F_{in}|p'(C_{HC},C_{in}) \cdot F_{HC}/|F_{HC}|+k_{in}E_{Diag}$$

With this correction, the black part is transferred unmodified into the color space of the highlight-color, since it should also be presented in the highlight-color image unmodified compared to the initial image.

With the above mapping, thus, the original black part is transferred unmodified and the original color part is mapped onto the color of the highlight-color. In the calculation of $C''_{Gamut}$, the color parts of $F_{in}$ are eliminated, these being either opposite or orthogonal to the color part vector $F_{HC}$ of the color of the highlight-color. The eliminated color part can be represented by $C''_{Gamut}-F_{in}$ or, respectively $C''_{Gamut}-C_{in}$. The physiological color effect $C''_{Gamut}-C_{in}$ is dependent on the respective color. For example, green is brighter then blue. This can be taken into consideration by means of a color culture vector $K_{kor}$ according to the following equation:

$$C_{Gamut}=C'_{Gamut}+((C'_{Gamut}-C_{in} \cdot K_{kor})E_{Diag}$$

The color correction vector has the following values (−0.12; −0.27; −0.03).

The above mapping allocates exactly one color value of the highlight-color color space to each color value of a color image. Highlight-color images that are very true-to-life for the human eye can be produced with this mapping. A color picture screen can be directly driven with the mapped color value $C_{Gamut}$ since this color value is a color value of RGB color space.

A highlight-color color image is printed in the highlight-color color and a standard color, usually black. A printer printing a highlight-color image usually comprises a toner in the color black and a toner in another color, for example in red, blue or white. For printing the highlight-color image, it is necessary that half-tone separations be generated for printing the color black and for printing the highlight-color color. For driving the half-tone separations, the color saturation values for the color black $K_{OUT}$ and for the highlight-color color $HC_{OUT}$ must be determined for each picture element of the highlight-color image.

The color saturation of the color black can, for example, be determined in a simple way with the following equation:

$$K_{OUT}=\max(r_{Gamut},b_{Gamut},g_{Gamut})$$

The maximum value of the three components of the mapped color value $C_{Gamut}$ is thereby selected, since this represents the projection of the mapped color value $C_{Gamut}$ onto the gray line GL.

The color saturation of the highlight-color color to be printed is calculated according to the following equation:

$$HC_1 = \frac{F_{HC} \cdot F_{Gamut}}{|F_{HC}|^2} \cdot 255$$

Since the black toner covers the highlight-color color, the color part must be boosted given dark colors, the following correction is inserted for this purpose:

$$K_1 = \left(255 - K_{OUT}/255 \quad HC_{OUT} = \frac{HC_1 \cdot 1.05}{1.05 - K_1}\right.$$

The color blank and the highlight-color color can be driven at a printer with the values $K_{OUT}$ and $HC_{OUT}$. For representing the different color saturation levels, the color separations described with the color saturation values are dithered with known methods.

When mapping the color values of a color image onto the highlight-color color space, it is not all is necessary that an optimally true-to-life map be generated; rather, it is sometimes even desirable that, instead of a true-to-life map, the colors employed in the color image are represented such in the highlight-color image that they can be clearly be distinguished from one another. Such a map is particularly desired given commercial graphics wherein, for example, individual managerial events are presented with different colors. It is thereby significant that the individual managerial events can in turn be clearly distinguished from one another given a mapping into the highlight-color space.

Given a mapping of a color image representing a subject that is not true-to-life onto the highlight-color color space or some other mode of presentation, thus, the different colors of the color image should be optimally clearly distinguished from one another in the mapped image. Further, it is expedient that the colors black and white of the color image are in turn mapped onto black and white in the mapped image.

To this end, the color image to be mapped is first analyzed. In the analysis of the color image, the color values $C_{in-i}$ contained in the color image are determined and their plurality l and their frequency of occurrence are identified. These color values are entered into a table having two columns (FIG. 2a), being entered into the left-hand column.

In the following processing step, the individual color values are sorted, whereby the color values for the color white and the color black are initially placed at the first two locations in the column. The other color values are sorted according to their frequency of occurrence (FIG. 2a□FIG. 2b).

The color values $C_{HC-i}$ to be mapped or, respectively, the corresponding modes of representation are to be entered in the right-hand column of the table from FIGS. 2a through 2c. In a mapping onto the highlight-color color space, the color values $C_{HC-i}$ of the highlight-color color space are arranged uniformly distributed in this raster which, for example, is lozenge-shaped.

Figure 3:
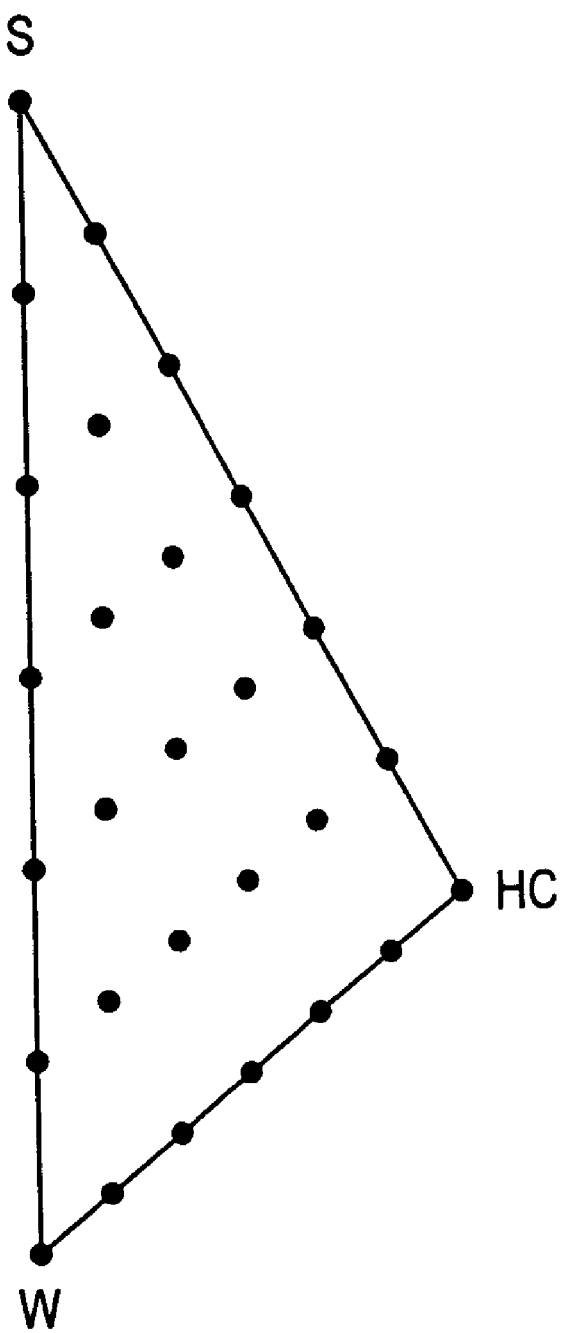
FIG. 3 is a diagram which shows the distribution of color values in a highlight-color color space.

FIG. 3 shows the highlight-color color space for a highlight-color HC. This color space is represented by a triangle whose one side edge is the gray line GL of the RGB color space of FIG. 1. The gray line extends between the colors black and white that respectively form a corner of the triangle. The third corner of the triangle is formed by the highlight-color color HC. The area of triangle represents the area in the cube of FIG. 1 between the gray line GL and the color values HC of the highlight-color color. The highlight-color color values $C_{HC-1}$ through $C_{HC-m}$ onto which a color value of the color image can be mapped are arranged in a grit having lozenge-shaped grid cells in the exemplary embodiment shown in FIG. 3, whereby each corner of a grid cell represents such a highlight-color mapping color value $C_{HC-i}$. This grid is constructed, for example, such that n highlight-color mapping color values $C_{HC-i}$ are arranged at every side edge of the triangle distributed equally spaced over the respective side edge, whereby a highlight-color mapping color value is allocated to each corner point of the triangle. The Lozenge-shaped grid is erected by means of correspondingly regularly spaced color values between these highlight-color mapping color values $C_{hc-i}$ arranged on the edges of the triangle. $m=(n+1)\cdot n/2$ highlight-color mapping color values thereby derive. The plurality of highlight-color mapping color values is to be selected such that the individual highlight-color mapping color values are, on the one hand, spaced far from one another in order to be able to be clearly distinguished from one another by the human eye and, on the other hand, such that an adequate plurality are present in order to be able to map the color values present in the color image to be mapped as completely as possibly thereon. For n=22, for example, 253 highlight-color mapping color values derive. This is a plurality of color values that is adequate for most purposes. The value n therefore preferably lies in the range from 3 through 25. Higher values of n are not expedient since the distinguishability of the individual colors is lost as a result thereof.

Instead of a lozenge-shaped grid, for example, a grid having triangular cells can also be provided. Given such a grid, the plurality m of all highlight-color mapping color values must be determined with an equation other then the above-recited equation ($m=(n+1)n/2$).

Based on the criterion of the plurality l of color values $C_{HC-i}$ of the color image to be mapped, the plurality m of the highlight-color mapping color values $C_{HC-i}$ is defined, whereby the smallest n is selected for which m is greater than or equal to l. The following thus applies:

$$m(n)l$$

The individual color values of the color image to be mapped are now to be allocated to these highlight-color mapping color values. First, the corresponding color value $C_{HC-1}$ of the color white is allocated to the color value $C_{in-1}$ of the color white. The corresponding case is carried out in the second row of the table for the color black.

The further allocation ensues by means of a hash function $f_{HASH}$. To this end, for example, the above-explained mapping onto $C_{Gamut}$ is employed, $f_{HASH}(C_{in})=C_{Gamut}$. A color value $C_{in-i}$ to be mapped is thus initially mapped onto $C_{Gamut-i}$. That value of the highlight-color mapping color values $C_{HC-i}$ that is still free and closest to $C_{Gamut-i}$ is then determined and this highlight-color mapping color value is allocated to the original color value $C_{in-i}$, i.e. these two values are written into the same row in the table of FIG. 2c. When the closest highlight-color mapping value has already been assigned, then the next free highlight-color mapping color value must be selected. In that the color values $C_{in-i}$ that occur most frequently are allocated first, these are allocated with prioritization, this assuring that these have a highlight-color mapping color value allocated to them that corresponds optimally well to the corresponding $C_{Gamut-i}$. As a result thereof, a map of the color image that is optimally similar for the human eye is produced in addition to the optimally good distinguishability of the individual colors of the highlight-color image.

If the plurality of color values $C_{in-i}$ of the color image to be mapped is greater then the maximum plurality ($m(n_{max})$) of the highlight-color mapping color values $C_{HC-i}$, then all color values $C_{in-i}$ cannot be mapped.

A possible solution of this problem is comprised in not allocating the color values $C_{in-i}$ having a frequency of occurrence less then 0.05% through 0.5%.

Another possibility is that, for example, the list with the frequency of occurrences of the individual color values $C_{in-i}$ is cut off as soon as at least 99.55 of the area of the image has been covered.

If the two above-recited possibilities for reducing the plurality of color values to be mapped do not suffice, then the individual color values $C_{in-i}$ with the hexadecimal number F8F8F8 can be masked, as a result whereof the plurality of color values is clearly reduced. The color image must be re-analyzed after the marking of the individual color values. A certain imprecision is produced as a result of the marking but this is often of no consequence given commercial graphics. It must be thereby be taken into consideration that such graphics usually have only a low number of colors, whereby, however, color values deviating therefrom can occur at boundary locations, for example due to a bleeding of the color and, in particular when scanning. The above masking then represents an insignificant information loss since only this color bleeding at the boundaries of neighboring color fields is omitted. After the masking, the frequencies of occurrence of the individual colors must be redetermined and the allocation to the highlight-color mapping color values must ensue.

Once the mapping table has been compiled, then the color values of a color image can be mapped onto a highlight-color color space merely by selecting the corresponding highlight-color mapping color values. This can be very quickly implemented and leads to a highlight-color image wherein the individual colors of the original color image can be clearly distinguished from one another.

The mapping of color images representing subjects that are not true-to-life has been described above with reference to a mapping onto the highlight-color color space. Within the framework of the invention, it is also possible that the color values of the color image are image dotted different filling patterns with such a map, these representing corresponding colors of the color image in the mapped image. For example, it is also possible with such a mapping to distinguishably represent the different chromatic regions of a color image in a black-and-white image. Given such a modification, the corresponding filling patterns are merely inserted in the table from FIG. 2c in the right-hand column thereof instead of the highlight-color mapping color values.

Dependent on the demands, some other allocation of the highlight-color mapping color values to the color values of the color image can also ensue, whereby, for example, certain freely selectable color values of the color image are to be handled with priority. With respect thereto, the aforementioned hash function can also be modified in that, for example, specific company colors are always allocated to the same highlight-color colors. For example, it can also be expedient to respectively employ the same hash function or even the same table for the allocation of different color images of an image sequence, even though different color values are contained in the individual color images that, given the above-described allocation via the frequency of occurrence, would yield different allocations of the individual color values of the color image to different highlight-color mapping color values.

Figure 4:
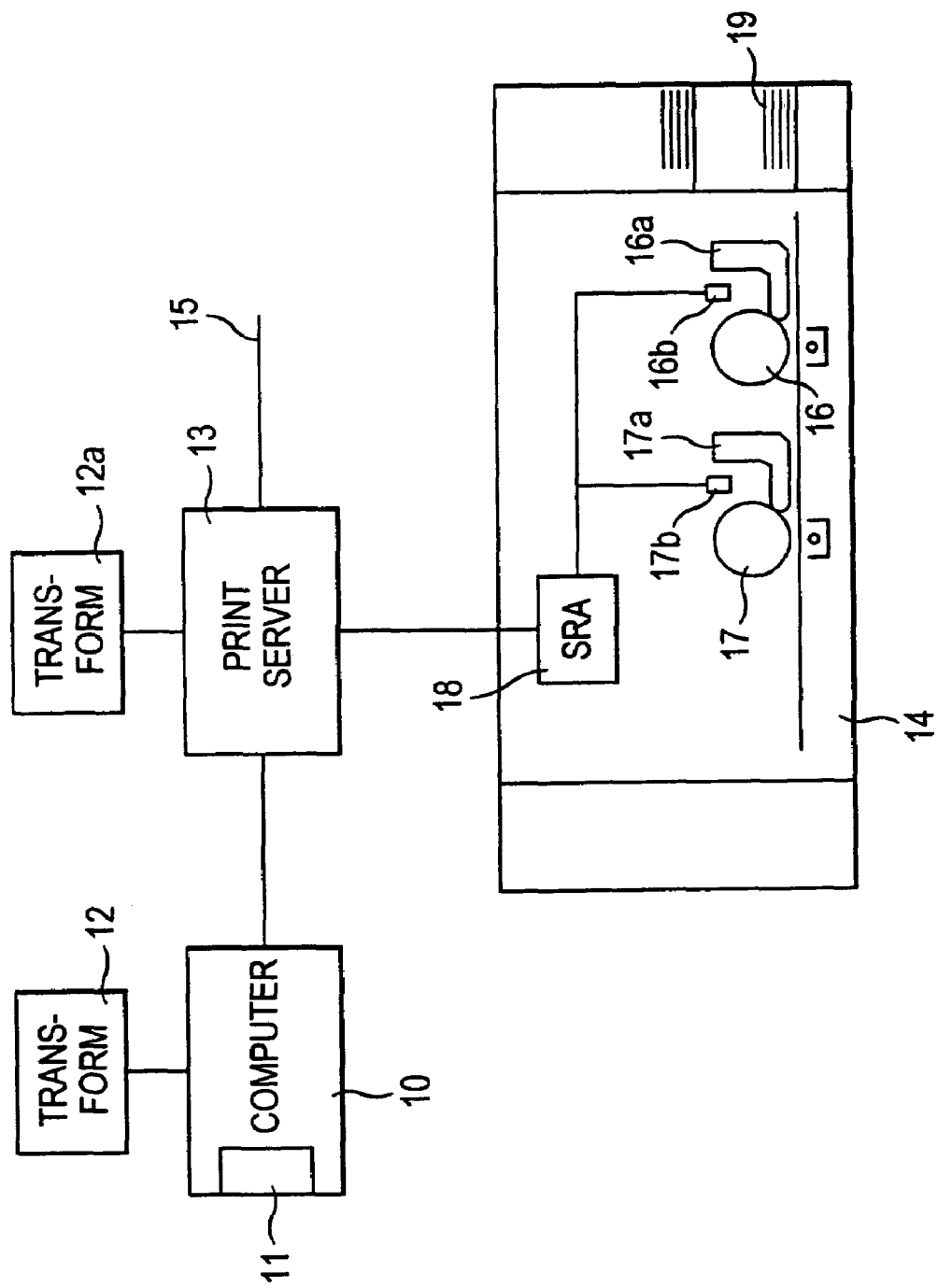
FIG. 4 is a functional block diagram of a printing system.

FIG. 4 shows a printing system wherein chromatic image data referred to a full color space (RGB) are generated in a user software program 11 running on a user computer 10. The image data generated in this way can then be converted onto the HLC color space with the inventive, above-described method by means of a transformation software program 12 or, respectively, by means of a corresponding electronic circuit (hardware) in the user computer 10. Subsequently, the data edited in this way are transmitted to a print server 13 to which a printer device 14 is in turn connected. Further computers can be connected to the print server 13 via the terminal 15, the print server 13 also being capable of receiving RGB image data or other full color image data such as yellow, magenta-cyan-black (YMCK) image data from these that are not optimized to the HLC color space. The corresponding conversion of such full color image data onto HLC image data can then ensue via the transformation software program 12a installed in the print server 13, this functioning exactly like the transformation program 12.

Two printing stations 16 and 17 that can each respectively print in two different colors are located in the printer device 14. To that end, for example, the electrophotographic printer unit 16 comprises a developer station 16a containing black toner and the printing unit 17 comprises a developer station 17a containing red toner. Moreover, each of the printing units 16, 17 contains known electrophotographic components such as a photoconductor drum, corotron devices, and an exposure unit such as, for example, a light-emitting diode comb. The data received by the print server are thereby received by a scalable raster architecture (SRA) print data controller 18 contained in the printer device 14, are respectively rastered into individual picture elements and are supplied true-to-color to the two printing units 16, 17 or, respectively, the corresponding light-emitting diode combs 16b, 17b for forming a latent image on the corresponding photoconductor drum. The electrostatic images that have arisen in this way are then developed with toner electrophotographically in known way and are transfer-printed such onto the recording medium, here an individual paper sheet 19, that the desired HLC image arises on the paper sheet 19.

The above-described mapping methods for optimally true-to-life mapping onto the highlight-color color space as well as the method for mapping images that represent objects that are not true-to-nature can be implemented off-line. Particularly given the latter method, a mapping table can be generated off-line, this being capable of being applied repeatedly and fast to different color images of an image sequence and allowing a very fast conversion into a different presentation mode.

The invention can be realized both as a computer program as well as a computer program product or can be integrated in a computer and, in particular, in printing systems having connected print servers. It can thereby run on a server, on a client PC, in a printer device, particularly within the above-described SRA controller and/or on a computer integrated into a data network or other system. Corresponding program data files can be stored on a data carrier or can be disseminated via LAN and WAN networks such as the Internet. The invention can be summarized in brief in the following way:

The invention is directed to a method for mapping color values of a color image onto a highlight-color color space.

In the inventive mapping method, the color values of the color image to be mapped that are represented in the RGB color space are mapped with a mapping step onto the highlight-color color space that corresponds to a projection of the color values onto the highlight-color. The corresponding calculations ensue in the RGB color space. A conversion into a different color space is not necessary. Moreover, various corrections are provided, so that a highlight-color image that is as true-to-life as possible for the human eye is produced.

Thus, as is apparent from the foregoing, the present method may be further characterized in that the mapping factor is exponentiated with 3. According to one embodiment, the black part of the color value to be mapped is multiplied by a unit vector that is directed in the direction of a line in the RGB space describing the gray levels, and this product is added to the mapped color value. The color correction value is calculated in that the vector difference between the mapped color value and the color value to be mapped is multiplied by a color correction vector and the product resulting therefrom is multiplied by the unit vector that is directed in the direction of the line in the RGB color space describing the gray levels, and the color correction value deriving therefrom is added to the mapped color value for the presentation of the mapped and corrected color value. Further, the color correction vector may be represented by the vector. In an additional improvement, a half-tone separation for the highlight-color color and a half-tone separation for a standard color are derived from the mapped and corrected color value.

Additional improvements to the method provide that the color values of the color image are mapped onto the highlight-color color space and color value uniformly distributed in the highlight-color space is identified and allocated to the color values of the color image by means of a hash function. The mapping may be employed as hash function, whereby the color value in the highlight-color color space determined by means of the hash function is allocated to the next free color value of the mapping table. The color values of the color image whose frequency of occurrence is lower than a predetermined value are not accepted into the mapping table according to one development. In the preferred method, the color values of the color image are masked with the hexadecimal number F8F8F8 at least before the allocation to the color values of the highlight-color color space.

Although other modifications and changes may be suggested by those skilled in the art, it is the intention of the inventors to embody within the patent warranted hereon all changes and modifications as reasonably and properly come within the scope of their contribution to the art.

The invention claimed is:

1. A method for mapping color values of a color image that are represented as vectors in RGB (red, green, blue) color space onto color values of a highlight color image that only includes vectors in a highlight-color color space that covers a region in the RGB color space between all gray scale values and a highlight-color color, the method being performed by a computer program on a data carrier comprising the steps of:
   allocating a color value in the RGB color space to each picture element of the color image;
   prescribing a highlight-color color by a color vector in the RGB color space;
   determining a color part of the highlight-color color by vector subtraction of a black part from the color value;
   determining a color part of the color value to be mapped by vector subtraction of a black part from the color value;
   mapping the color values of the color image onto the color value of the highlight-color color space by determining a mapping factor by calculating a cosine between the color parts;
   multiplying the mapping factor by a unit vector that is directed in a direction of the highlight-color color and an amount of the color part of the color value to be mapped, and printing the color image mapped into the highlight-color color space on a recording medium using a printer.

2. A method according to claim 1, further comprising: raising the mapping factor to a power of three.

3. A method according to claim 1, further comprising the steps of:
   multiplying the black part of the color value to be mapped by a unit vector that is directed in the direction of a line in the RGB space describing the gray levels to produce a product value, and
   adding said product value to the mapped color value.

4. A method according to claim 3, further comprising the steps of:
   calculating a color correction value including:
     multiplying the vector difference between the mapped color value and the color value to be mapped by a color correction vector to produce a product value;
     multiplying the product value by the unit vector that is directed in the direction of the line in the RGB color space describing the gray levels to produce a color correction value; and
     adding the color correction value derived in said multiplying step of the product value by the unit vector to the mapped color value for presentation of the mapped and corrected color value.

5. A method according to claim 4, wherein the color correction vector is represented by the vector (−0.12; −0.27; −0.03).

6. A method according to claim 4, further comprising the steps of:
   deriving a half-tone separation for the highlight-color color and a half-tone separation for a standard color from the mapped and corrected color value.

7. A printing system, comprising:
   an apparatus including a computer program on a data carrier for implementation of a method according the following steps:
   allocating a color value in the RGB color space to each picture element of the color image;
   prescribing a highlight-color color by a color vector in the RGB color space;
   determining a color part of the highlight-color color by vector subtraction of a black part from the color value;
   determining a color part of the color value to be mapped by vector subtraction of a black part from the color value;
   mapping the color values of the color image onto the color value of the highlight-color color space by determining a mapping factor by calculating a cosine between the color parts;
   multiplying the mapping factor by a unit vector that is directed in a direction of the highlight-color color and an amount of the color part of the color value to be mapped; and
   printing the color image mapped into the highlight-color color space on a recording medium using a printer.

8. A data carrier having stored thereon a computer program product that when run on a computer effects a method having the following steps:
   allocating a color value in the RGB color space to each picture element of the color image;
   prescribing a highlight-color color by a color vector in the RGB color space;
   determining a color part of the highlight-color color by vector subtraction of a black part from the color value;
   determining a color part of the color value to be mapped by vector subtraction of a black part from the color value;
   mapping the color values of the color image onto the color value of the highlight-color color space by determining a mapping factor by calculating a cosine between the color parts;
   multiplying the mapping factor by a unit vector that is directed in a direction of the highlight-color color and an amount of the color part of the color value to be mapped; and
   printing the color image mapped into the highlight-color color space on a recording medium using a primer.

* * * * *